(12) United States Patent
Stephens

(10) Patent No.: US 10,446,053 B2
(45) Date of Patent: Oct. 15, 2019

(54) MULTI-FUNCTIONAL ROPING SLED FOR HEADER AND HEELER TEAM ROPING PRACTICE

(71) Applicant: Sandy Hart Stephens, Prosper, TX (US)

(72) Inventor: Sandy Hart Stephens, Prosper, TX (US)

( * ) Notice: Subject to any disclaimer, the term of this patent is extended or adjusted under 35 U.S.C. 154(b) by 0 days.

(21) Appl. No.: 15/407,232

(22) Filed: Jan. 16, 2017

(65) Prior Publication Data

US 2017/0270819 A1 Sep. 21, 2017

Related U.S. Application Data

(60) Provisional application No. 62/256,523, filed on Nov. 15, 2015.

(51) Int. Cl.
| | |
|---|---|
| A63B 69/00 | (2006.01) |
| G09B 19/00 | (2006.01) |
| A01K 15/00 | (2006.01) |
| G09B 9/00 | (2006.01) |

(52) U.S. Cl.
CPC ........ *G09B 19/0038* (2013.01); *A01K 15/003* (2013.01); *A63B 69/0068* (2013.01); *G09B 9/00* (2013.01); *A63B 2210/50* (2013.01); *A63B 2225/09* (2013.01)

(58) Field of Classification Search
CPC ................................................. A63B 69/0068
USPC .......................... 273/359, 366–370; 119/839
See application file for complete search history.

(56) References Cited

U.S. PATENT DOCUMENTS

| | | | | |
|---|---|---|---|---|
| 4,136,874 A | * | 1/1979 | McCord ............. | A63B 69/0068 273/339 |
| 4,662,642 A | * | 5/1987 | Archibald .......... | A63B 69/0068 273/339 |
| 5,009,432 A | * | 4/1991 | Richard ............. | A63B 69/0068 273/339 |
| 5,286,032 A | | 2/1994 | Spencer | |
| 6,012,407 A | * | 1/2000 | Farley ..................... | B63B 21/56 114/215 |
| 6,736,399 B1 | * | 5/2004 | Copenhaver ....... | A63B 69/0068 119/839 |
| 7,059,605 B1 | * | 6/2006 | Hughes ................ | A01K 15/003 273/338 |

(Continued)

FOREIGN PATENT DOCUMENTS

DE 2001-148955 * 2/2001

*Primary Examiner* — Mark S Graham

(57) ABSTRACT

A heading and heeling roping practice sled apparatus having a heeling practice sled and a heading practice dummy, where the heeling sled has a single mainframe bar, a tow arm with an open-faced front tow hook as well as a closed or closeable ring for towing, a wheel assembly attached to the tow arm below the horns of the heading practice dummy, support legs configured to provide support for the mainframe and dummy, dummy mounting brackets attached to the support legs, securing straps and a quick release latch attached to the dummy mounting brackets, the dummy having a flanged base for securing the dummy to the sled within the dummy brackets, and a roping leg apparatus attached to the rear of the mainframe. The roping leg apparatus has a hip assembly with a coupling attached thereto which are non-linear axles, and hinges positioned about the axles to which roping legs are mounted.

5 Claims, 15 Drawing Sheets

(56) References Cited

U.S. PATENT DOCUMENTS

| | | |
|---|---|---|
| 7,293,775 B1 | 11/2007 | Donnelly |
| D700,245 S * | 2/2014 | Overbay .................... D21/304 |
| 8,720,894 B2 * | 5/2014 | Whitaker ............... A01B 49/00 |
| | | 172/766 |
| 8,783,689 B1 | 7/2014 | Copenhaver |
| 9,129,534 B2 * | 9/2015 | Payne .................. G09B 19/003 |
| 9,533,209 B1 | 1/2017 | Copenhaver |
| 2006/0170163 A1 * | 8/2006 | Perkins .............. A63B 69/0068 |
| | | 273/359 |
| 2016/0029596 A1 | 2/2016 | Bruegman et al. |

* cited by examiner

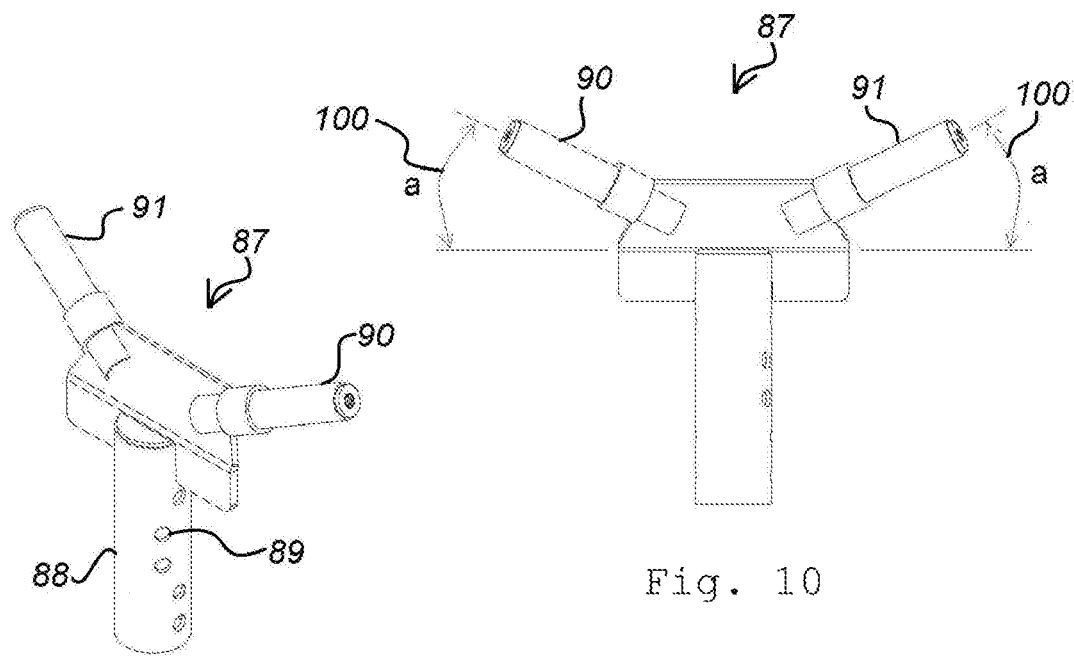
Fig. 9
Fig. 10
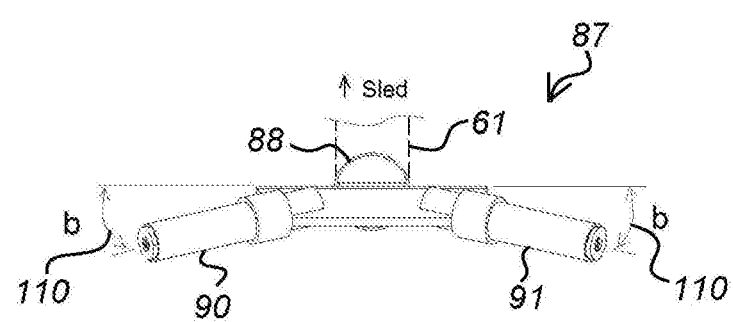
Fig. 11

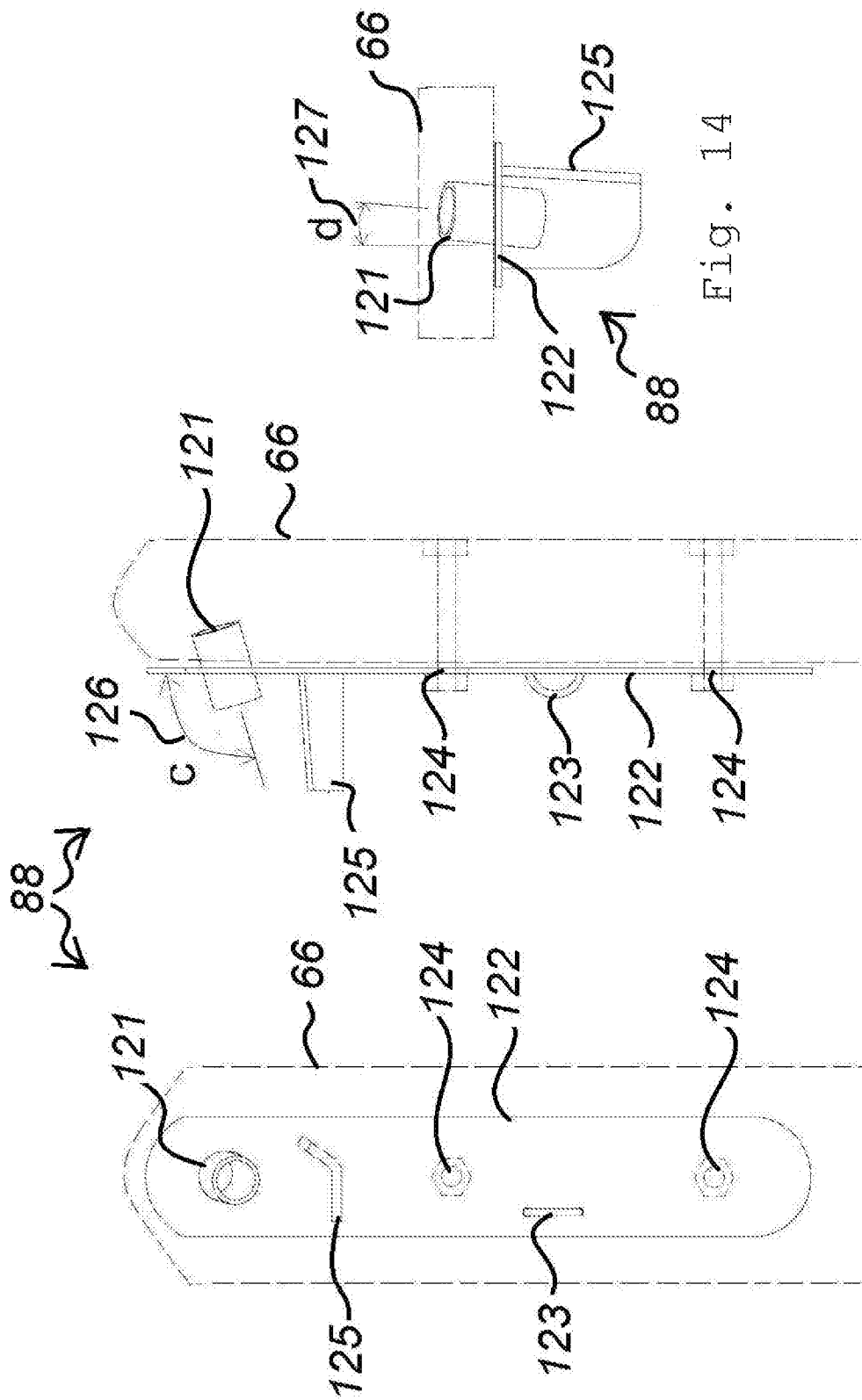

MULTI-FUNCTIONAL ROPING SLED FOR HEADER AND HEELER TEAM ROPING PRACTICE

CROSS-REFERENCE TO RELATED APPLICATIONS

This application claims priority of provisional application Ser. No. 62/256,523 filed Nov. 17, 2015.

FIELD OF THE INVENTION

The present invention relates to roping practice devices, commonly referred to as roping sleds, that are used for practicing heading, heeling, calf roping, and steer wrestling, and for training a horse as well as a roper.

BACKGROUND OF THE INVENTION

Roping practice sleds are well known in the art and are used primarily for helping ropers train themselves to compete as well as to train their horses. They are also used for recreational roping.

Advancements have been made to roping sleds over the years, including the addition of collapsible horns as disclosed by Copenhaver, U.S. Pat. No. 7,430,990, and Nelson, U.S. Pat. No. 6,497,411, as well as leg motion mechanisms such as those disclosed by Nelson, U.S. Pat. No. 5,709,386, and Donnelly, U.S. Pat. No. 7,293,775, and body motion as disclosed by Bruegman et al., patent application No. 20160029596.

There are many heeling practice sleds on the market that are configured with a non-removable steer body. The primary benefits of combining a heeling sled with a removable ground heading dummy are overall cost of roping practice products, ease of transport, and multi-function capability of using the ground heading dummy while being mounted on a horse. Currently, there is only one version of the prior art of sleds that that combines a heeling practice sled with a removable ground roping dummy—the Smarty Steer. However, the Smarty Steer, and other sleds have the following shortcomings—they do not provides for a variety of settings to allow multiple configurations to replicate a wide range of scenarios that a roper might encounter while roping a live steer, such as horns of various length and rotation, a head tilted to one side, or legs and hips that are affixed at a skewed position, while providing a quick attachment mechanism for the ground heading dummy so that it can be easily installed and removed for standalone use.

Additionally, with regards to the function of the legs and particularly legs that come together when roped, the prior art does not provide for legs that operate independently to emulate a real steer. Versions of the prior art that do provide for collapsible legs do so by providing two different spring elements operating in different planes—one to retract the legs forward, and the other to expand the legs apart from each other. The multiple spring configuration of the prior art does not allow the legs to operate independently, and requires excessive hardware that adds to the weight of the sled.

Additionally, with regards to the swinging out, or as Bruegman puts it "washing out" of the legs and hips of a real steer, a real steer's hind legs typically swing out when a header sets and turns the steer after roping it, particularly when the header turns the steer in a rapid fashion in order to expedite the run. Although the prior art presented by Bruegman does replicate the body of the steer swinging out, a roper practicing would simply wait for the body to swing back in before roping, or would only have one instant, in the corner of the turn, to attempt to rope the legs in the swung out position. The prior art does not offer a mechanism for the legs to be affixed in the swung out position such that the roper will have greater opportunity to practice the fundamentals of properly swinging and delivering his rope to catch a steer on the "corner shot".

Additionally, Bruegman discloses an aft section of the sled body that swings outward, but not legs that move independently from side to side relative to the body.

Additionally, the prior art does not provide for a mechanism whereby the legs can be raised and lowered with relative ease without raising and lowering the entire body of the steer, which is difficult for a youth roper or roper of little strength.

Additionally, with regards to collapsible horns, the prior art limits the length and configuration of the horns because each horn rotates within the same plane as the other horn such that they touch each other upon collapse, regardless of the invention of Copenhaver apparatus which allows the horns to also tilt backward relative to the sled. This coplanar rotation limits the angle of rotation of the horns because they ultimately collide with each other upon collapse. Due to this limited angle of rotation, the collapsible horns can only be a certain length and have a limited curvature, while simultaneously accurately replicating the horn position of a real steer, otherwise the rope will not slide off upon capture of the horns and tension of the rope.

Additionally, coplanar horn rotation prohibits the horns from being positioned to face forward or even down while in the stationary, non-collapsed position, else the rope will not release upon collapse of the horns.

Additionally, there is no prior art with a removable dummy that allows the head to be tilted from one side to the other to replicate a steer that tilts his head.

Additionally, there is no prior art that allows the easy securing and removal of a heading dummy with a solid base by a youth roper or roper of relatively little strength. Products such as the Rope Rite sled allow a dummy to be tied on or otherwise secured to a flat base by tie-down straps or bolts, but are not designed to complement a dummy to be rapidly affixed to and removed from the sled, nor readily affixed at a practical heading angle. One embodiment of the prior art—the Smarty Roping Steer—does provide a system by which a heading dummy with a hollow base can be lifted up, over, and positioned onto a sled, but this requires strength and height beyond that of a youth roper, and the hollow base of the heading dummy reduces stability of the dummy when positioned on the ground and allows the dummy to undesirably slide around more easily.

Another shortcoming of the prior art is current products on the market are excessive in weight, which limits the ability to replicate sporadic movements. Weight limits the tendency of the sled to sporadically slide from side to side with the inundations of the ground over which it is pulled. Excessive weight also requires the towing device—rope, chain, spring loaded tow bar, etc.—to have a high tensile strength, which limits the elasticity, thus limiting sporadic changes in forward momentum, such as with a live steer. The greater the elasticity of the tow device, the easier it is to impart sporadic movements that emulate a live steer, and the better it is for the horse and roper to practice dallying without potential for injury. The prior art of sled towing devices that provide a buffer to allow dally practice consists of compression spring loaded damper tow bars, which do nothing to impart action on the sled as it is being towed, are heavy and cumbersome to transport, and not practical for a young roper or roper of lesser strength to hook up and utilize. Such devices also limit the distance which a sled will travel before it reaches the towing device reaches the limit of elasticity, thus minimizing the time that a roper has to practice dallying around the horn, given that the distance is limited by the compression length of the spring, which is generally no greater than 50% of the length of the spring. See McCarthy, patent application No. 20130026688.

Additionally, because of their heavy weight and the required rigid towing mechanisms, conventional sleds cannot be pulled through the corner at a rate of speed and with a minimal amount of surface friction that would allow the replication of a steer swinging wide, drifting, or washing out around the corner, without the need for the hinge mechanism disclosed by Bruegman, which further imparts weight.

Additionally, excessive weight requires a towing vehicle with greater power, and imparts excessive wear and tear on the towing vehicle.

Additionally, excessive weight and components make existing sleds difficult and costly to ship, and cumbersome to transport, particularly for a youth roper or roper of lesser strength.

Additionally, the prior art does not allow a header to rope, set and turn the sled for the header without the operator of the towing machine to first pull the sled in the general direction that the header is turning.

Additionally, the prior art does not allow the width or stationary position of the legs to be adjusted relative to each other to practice delivering the heel loop to variety of target configurations, including extra wide legs to practice getting the tip of the loop from the outside to the inside of the steer.

Thus, there is a need in the market for a combination heading and heeling practice sled that is lighter, comes apart in sections, is easier and cheaper to ship, easier to disassemble and transport, allows a heading ground dummy with a solid flat base to be easily affixed to and removed from the sled by a roper of virtually any strength and height; a sled which can be manipulated to replicate numerous configurations for training and practice, including turning the legs to the outside or inside of the sled, adjusting the legs asymmetrically to one another in the stationary position, adjusting the horns to tilt to the left or right, positioning the head to be in either a standard or downward orientation, having roping legs that may be spread further apart, having legs that are adjustable in height to increase the difficulty of roping when lowered; a sled that is lighter with a towing device that is more elastic to provide more erratic movements to emulate the speeding up, slowing down, and side to side movements of a live steer, a towing device and sled of lighter weight that makes it safer for the roper to practice dallying, imparts less strain on the roper and less strain on the horse when the rope is dallied around the saddle horn; a sled that due to its lighter weight imparts less wear on the tow vehicle; a sled that may be pulled rapidly and simultaneously turned sharply without turning over without the need for a rigid tow bar. There is also a need in the market for a collapsible, interchangeable horn system that allows for a multitude of sizes and angles of configurations of horns, while still allowing the rope to be released upon being pulled taught.

BRIEF SUMMARY OF THE INVENTION

The present invention offers the following novel improvements:

A heading and heeling roping practice sled apparatus with a total weight of less than 135 pounds, comprising a mainframe and crossed support legs, a quick release dummy attachment mechanism compatible with a dummy with a solid base, and a hip and leg apparatus comprising independently operating and overlapping legs that may be rotated about the mainframe and affixed in a skewed position.

Hip and Leg Apparatus with Independent and Overlapping Legs

A hip and leg apparatus comprising a cylindrical coupling onto which are mounted a leg axle or axles, onto which hinges are positioned and tension elements configured such that the each leg operates independently of the other and, when roped, come together such that the hocks or any part of the legs touch, cross over, or overlap one another, and where each leg is retracted to the stationary position by the force of a tension device acting independently from the tension device for the opposite leg, with each tension element operating through a single plane.

The present hip and leg apparatus can be rotated about and securely affixed in a rotated position about the rear of the mainframe of the roping sled disclosed herein, or to any mounting device of complimentary geometry—such as a pipe that may be mounted to the bumper of a vehicle—so that the roper may practice delivering his loop to legs are not oriented parallel to the roper and the horse.

The legs of the present hip and leg apparatus may be affixed in asymmetrical configuration to replicate a steer that does not hop uniformly.

The height of the present hip and leg apparatus may be adjusted by a youth roper or a roper of little strength with relative ease.

The width of the legs of the present hip and leg apparatus may be easily adjusted by interchanging the hinges on the hip and leg apparatus with hinges constructed with a greater angle in the vertical plane to increase the distance of the toes of the legs from one another, or by increasing the length of the leg axles.

Dummy Bracket and Mountable Dummy Apparatus

A dummy bracket apparatus comprising brackets for securing the base of the dummy, securing straps and a quick release latch that allows a ground heading dummy with a solid or flat base to be easily and quickly secured to and removed from the sled.

The dummy bracket apparatus of the present invention that can be adjusted up and down on either side to tilt the dummy head to one side or the other.

A ground roping dummy extruded at the base or that is otherwise constructed with notches at the base to provide leverage for attachment to a sled via a quick release connection system such to allow a youth roper or roper of little strength to attach the sled to the tow device with relative ease.

Bungee Tow Rope Apparatus

A bungee tow rope apparatus consisting of nylon covered bungee cord, ¾" to 1" in diameter, with a minimal tensile strength of 750 pounds, and an elasticity of 100 percent of the length of the bungee, with securing clips at each end, the bungee being practical in size, length and weight to pull a sled with a total weight of less than 130 pounds, such to reduce the wear on and danger to the horse and roper when practicing dallying, and having the capability of extending and retracting with the subtle randomness of the ground over which the sled is pulled, thus creating a non-uniform rate of speed, and when pulled through turn allowing the sled to drift to emulate a more realistic corner turn of a live steer.

Collapsible Horn Socket Apparatus for Overlapping Horns

A collapsible horn socket apparatus for incorporation into a heading dummy, comprising two individual horn sockets that rotate through different planes about axles aligned along non parallel vectors, thus providing clearance for the horns, therein inserted, as they are collapsed and eliminating the restriction of horn length or horn orientation while maintaining the ability for the rope to slide off the horns once collapsed and the horns being symmetrical while in the stationary non-collapsed position. The apparatus has a tension element that retracts the horns to the standard position once the rope slides off.

The horn socket apparatus of the present invention that allows the horns to collapse but that can be locked into place by insertion of a locking pin or other horn stabilizing device such that a header can pull the sled by the horns of the dummy without the horns collapsing, thus enabling the sled to be pulled to emulate the pulling of a live steer.

BRIEF DESCRIPTION OF THE DRAWINGS

A more complete understanding of the present invention may be had by reference to the following descriptions when taken in connection with the accompanying Drawings, wherein:

Prior Art

FIGS. 3 and 4 depict embodiments of the prior art illustrating collapsible roping legs whereby the functioning of each leg is dependent on two springs, one spring being a tension spring that is positioned longitudinal to the sled, and another tension or compression spring positioned parallel to the sled and connected to the legs above or below the axle about which the legs rotate, thus preventing the legs from operating independently.

Current Invention

Figure 6:
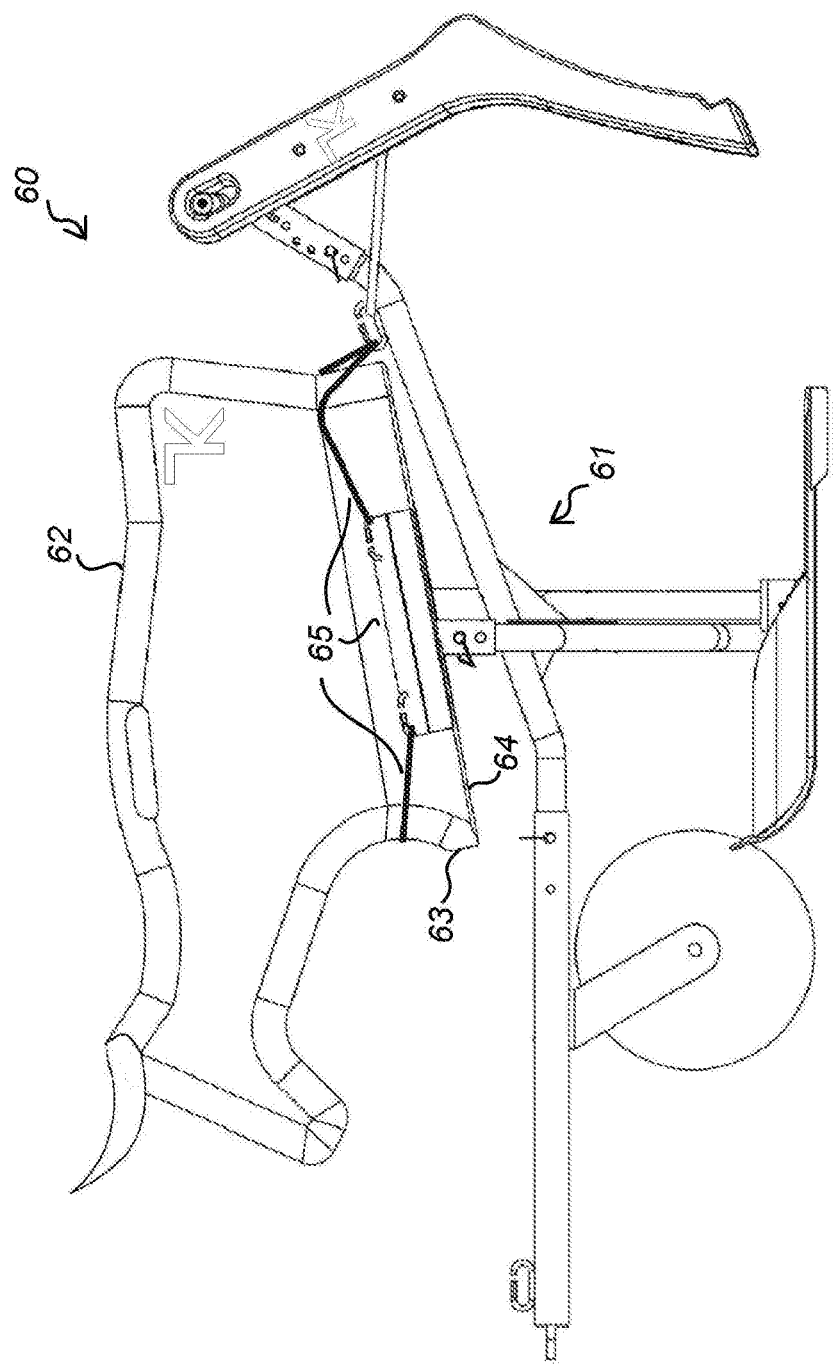
Figure 7:
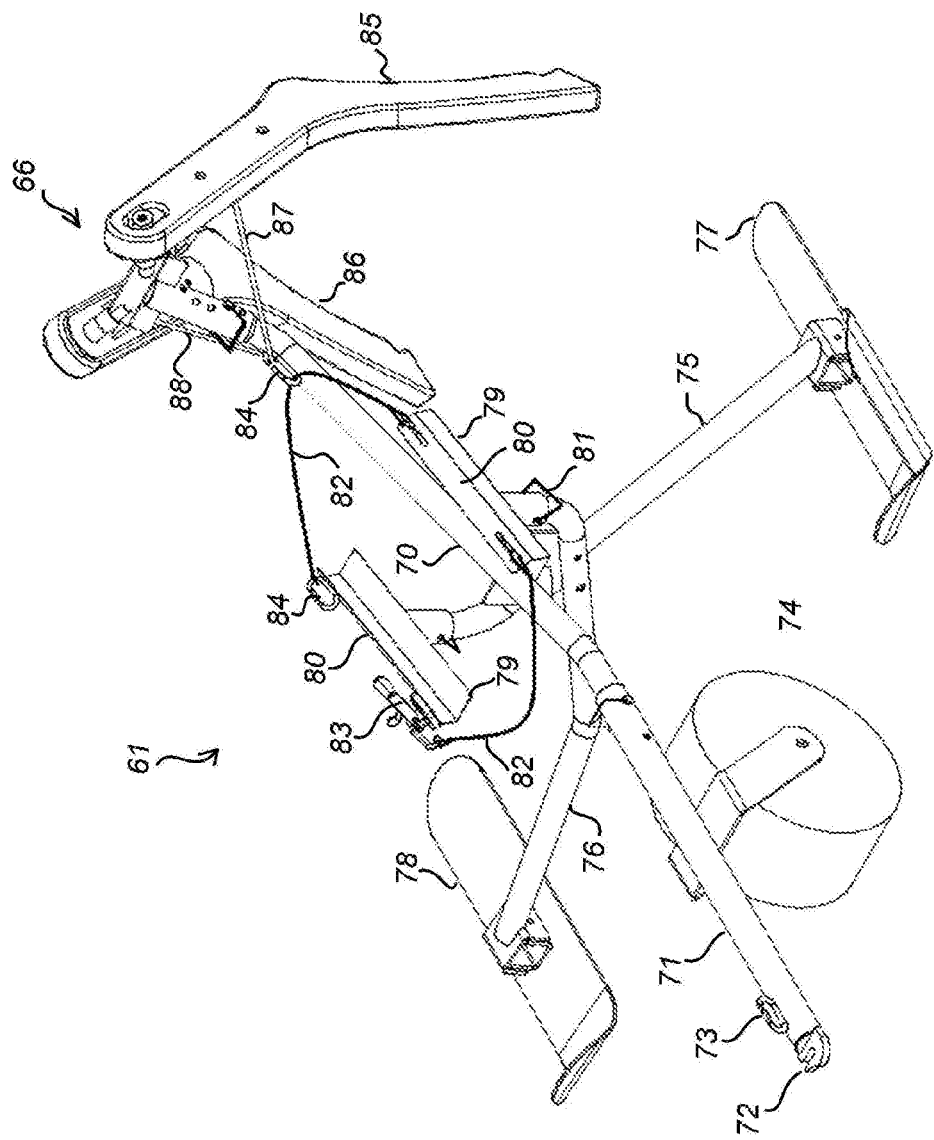

FIGS. 6 and 7 are perspective views of the current heeling sled and heading ground dummy apparatus, with and without the heading dummy secured to the sled.

Figure 8:
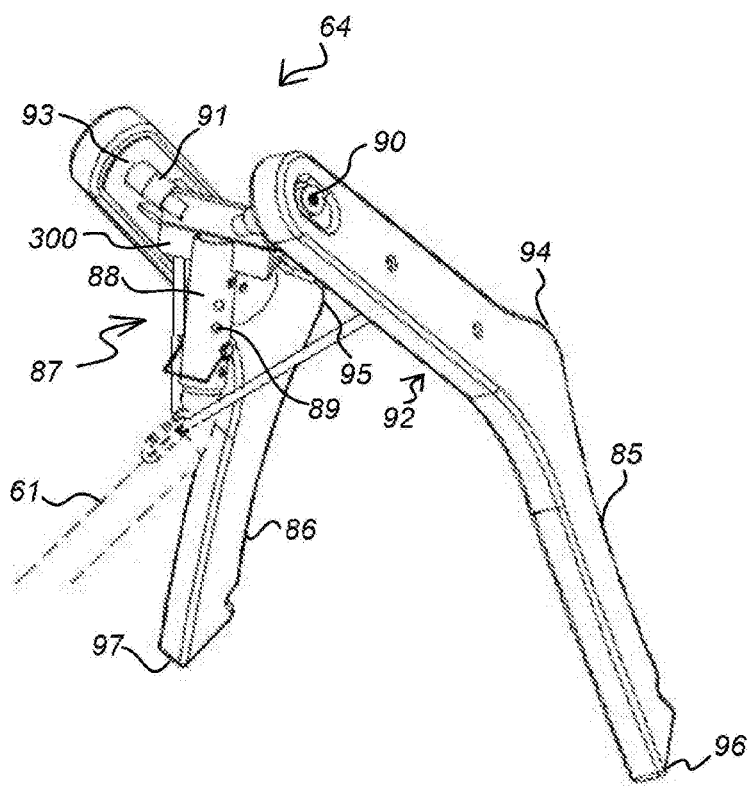

FIG. 8 depicts an embodiment of the current hip and leg apparatus with independently operating and overlapping legs, a hub and axle assembly consisting of a coupling with holes to which non-linear axles are affixed, to which roping leg mounting hinges are secured, the holes in the coupling allow the legs to be raised or lowered, leg hinges are mounted to the axles whereby the legs rotate independently about each axle and whereby upon rotation, or collapse, the hocks, or center portion of the legs, come together, and whereby each leg is retracted to the stationary vertical position by its own single tension element, which is held stationary by a tension element, which in this embodiment is a bungee strap that operates along a plane that is governed by the non-horizontal axis about which the hubs of the leg hinges rotate, a plane which is neither parallel nor perpendicular to the forward motion of the sled, and whereby the position of the legs as they rotate about the axle is governed by the angle of the mounting arm of the hinge relative to the hub of the hinge, and whereby the stopper plate on the leg apparatus, and stopper bar on the leg hinge, may be adjusted to alter the stationary orientation of the legs relative to each other.

FIGS. 9, 10 and 11 illustrate perspective, side and top views of the hub and axle assembly depicting the angles of configuration relevant to the functionality of the legs operating independently and within individual single planes and crossing over each other upon being roped together and pulled taught, and being retracted to the stationary position by a tension device acting through a singular plane, whereby the legs are spread apart in the stationary position.

FIGS. 12, 13 & 14 show the front, side and top views of the leg mounting brackets and depict representations of the angles of configuration relevant to the operation of each leg about a single plane, allowing the toes or hocks of the steer to be spread apart upon the stationary retracted position, and allowing the toes, hocks, or other part of the roping legs to come together and crossing over upon being roped.

Figure 15:
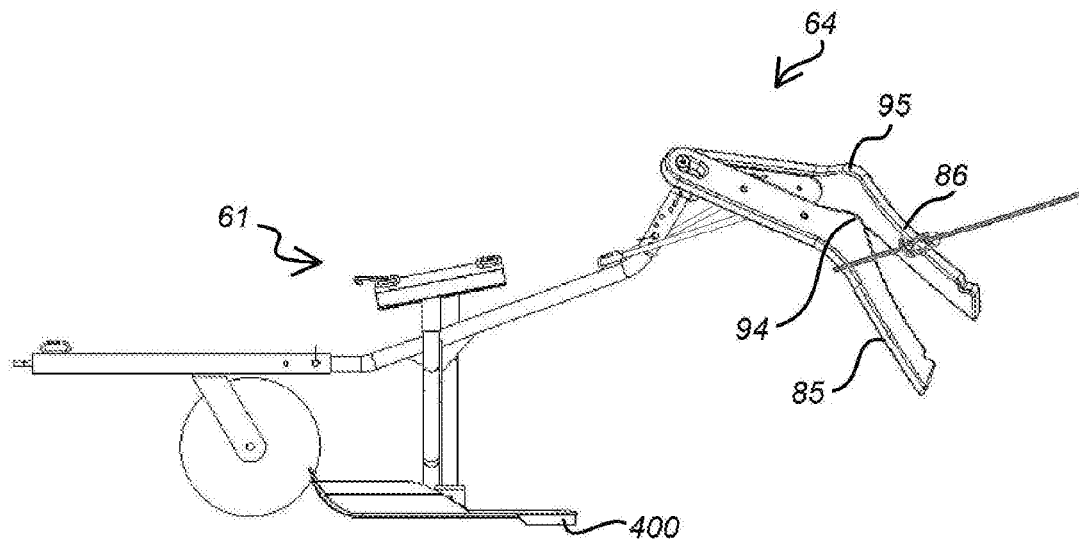

FIG. 15 is a side view of the hip and overlapping leg apparatus pulled taught with both legs captured by a rope, and thus oriented in the collapsed and overlapping position.

Figure 16:
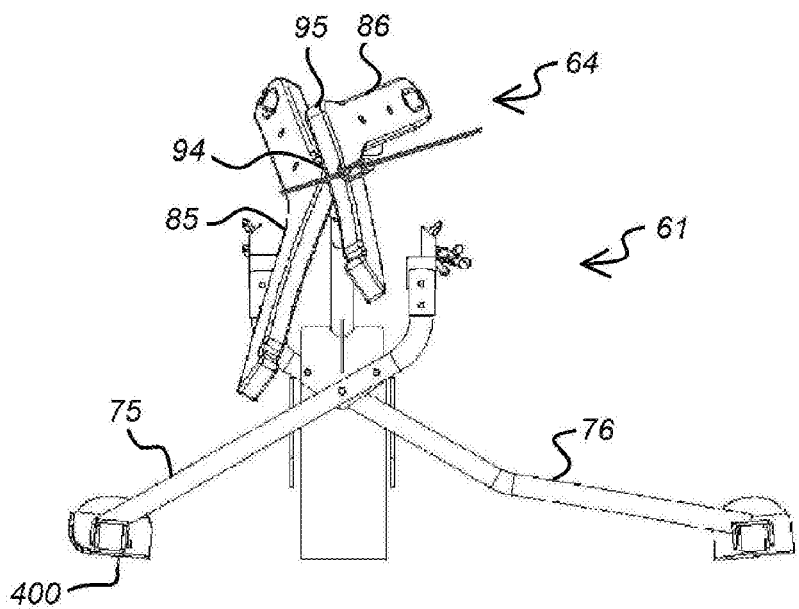

FIG. 16 is a rear view of the hip and overlapping leg apparatus pulled taught, illustrating the overlapping of the hocks, which emulates a live steer. This Figure also illustrates the extended width of the right support leg which helps stabilize the sled when towed by a rope around the horns of the dummy and offsets the turnover tendency when the sled is rapidly turned to the left. Also illustrated in this embodiment is a stabilizing fin on the left skid, which further helps stabilize the sled as it is being towed by a header on a horse with a rope around the horns of the dummy.

Figure 17:
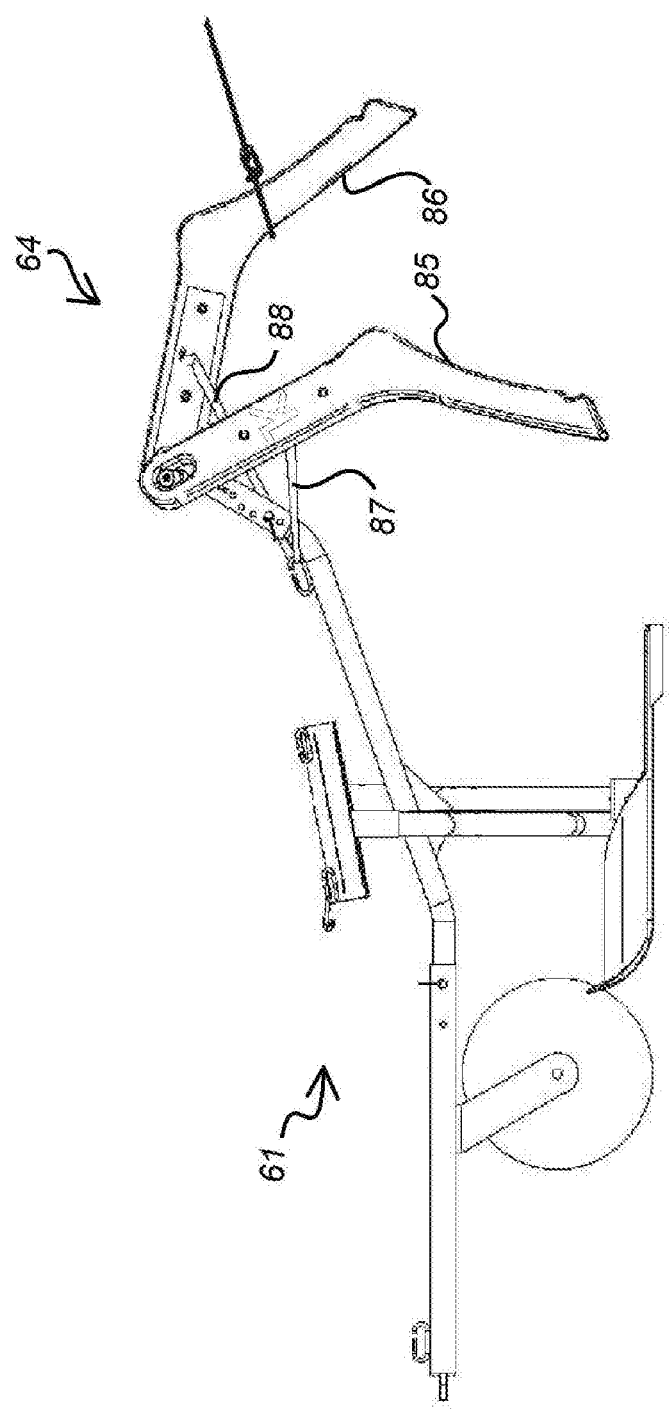

FIG. 17 depicts a side view of the sled and crossover leg apparatus whereby a single leg is captured and pulled taught by a roper, thus illustrating the independent operation of each leg.

Figure 18:
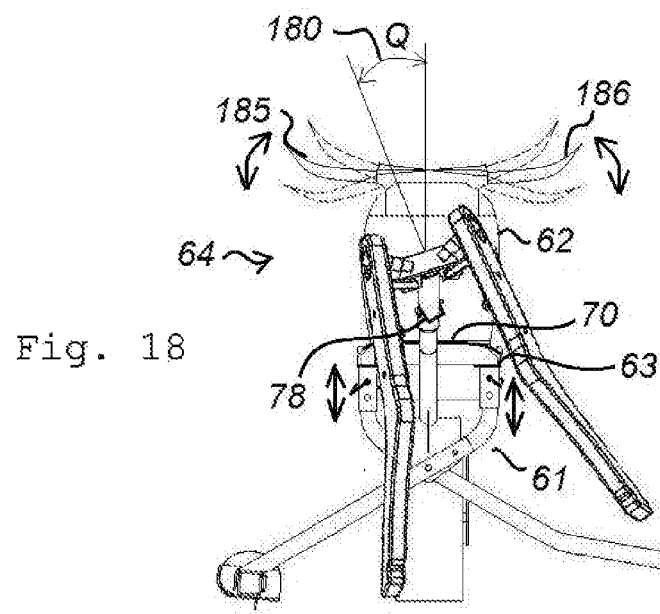

FIG. 18 depicts the hip and independent collapsible leg apparatus rotated about the mainframe to replicate the action of a steer's legs. The apparatus is securely positioned at a skewed angle to the outside to emulate the position of a steer's hind legs as it is pulled through the corner during a roping run, but may also be positioned to the left or inside to emulate a steer that swings back inward after washing outward.

FIG. 18 also illustrates that the dummy brackets may be raised or lowered to alter the orientation of the dummy body and the horns.

Figure 19:
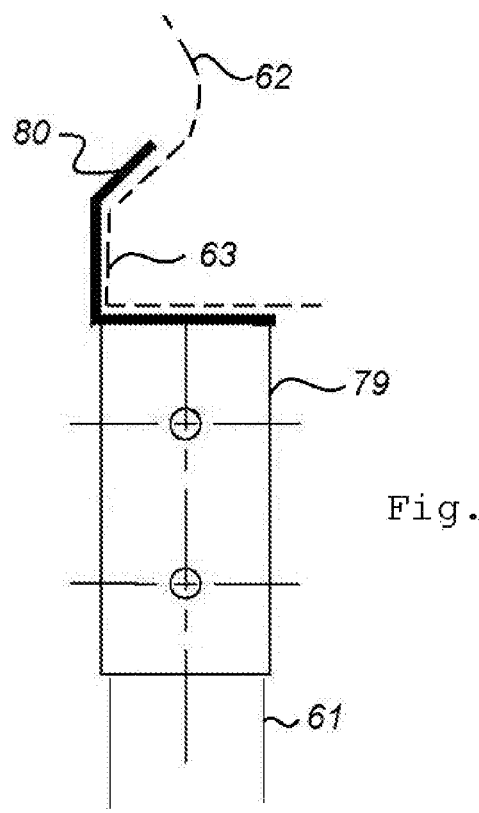

FIG. 19 is a cross-section of the dummy bracket with an angled clasp which provides leverage to the flanged base of the dummy to keep the dummy secured within the brackets, even when the sled is pulled by a rope around the dummy horns.

Figure 20:
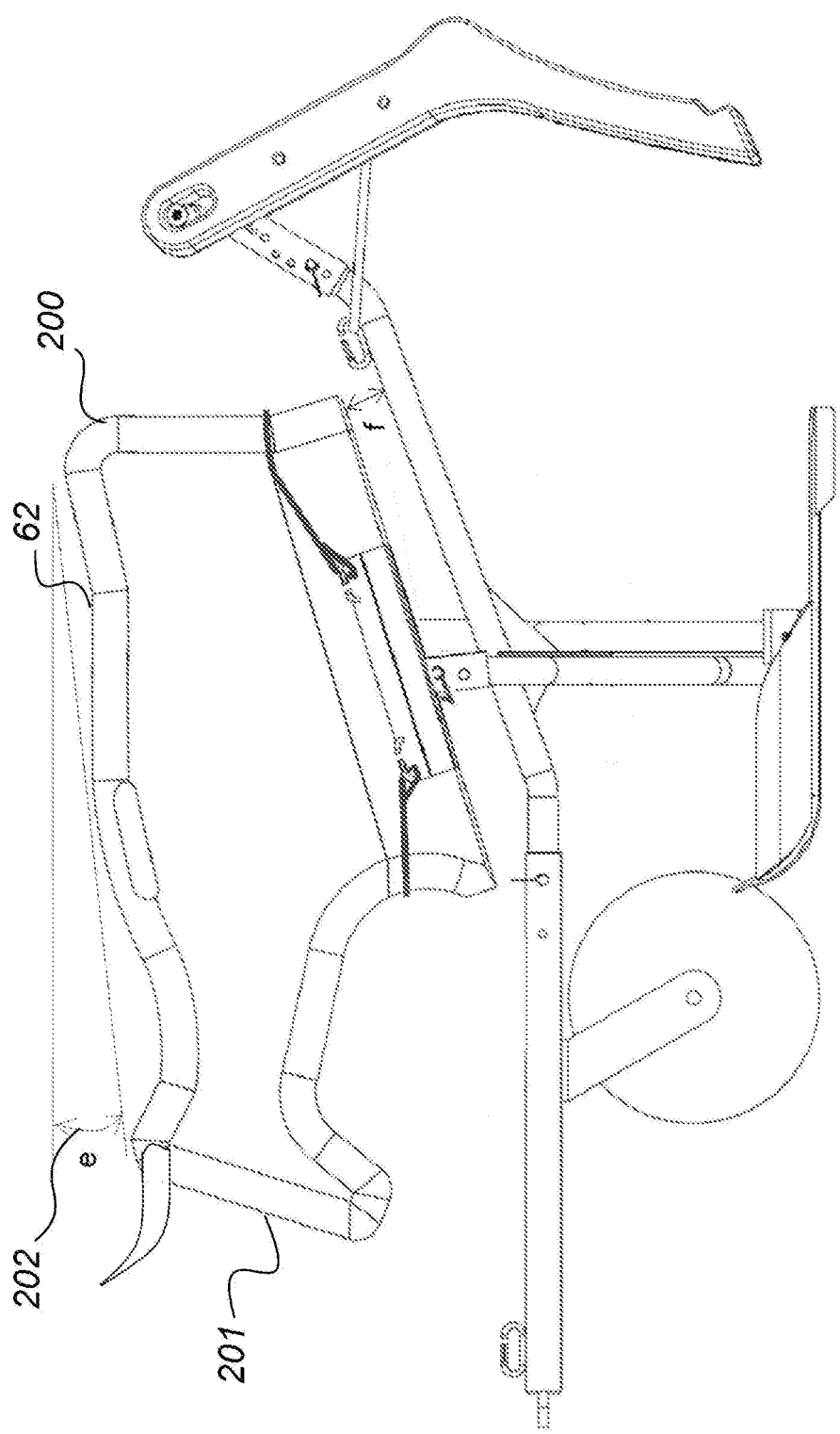

FIG. 20 illustrates that the dummy may be tilted forward to practice a more difficult heading angle of attack by removing the rear securing strap from the strap securing link, thus releasing the downward tension applied to the rear of the flanged base of the dummy, and thus allowing the rear of the dummy to rise and thus the head to be lowered to replicate a steer that runs with his head down.

Figure 21:
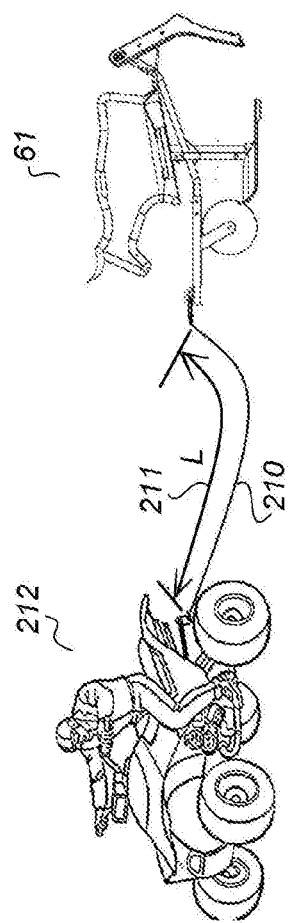

FIG. 21 depicts the bungee tow rope apparatus in the relaxed position being approximately seven feet long.

Figure 22:
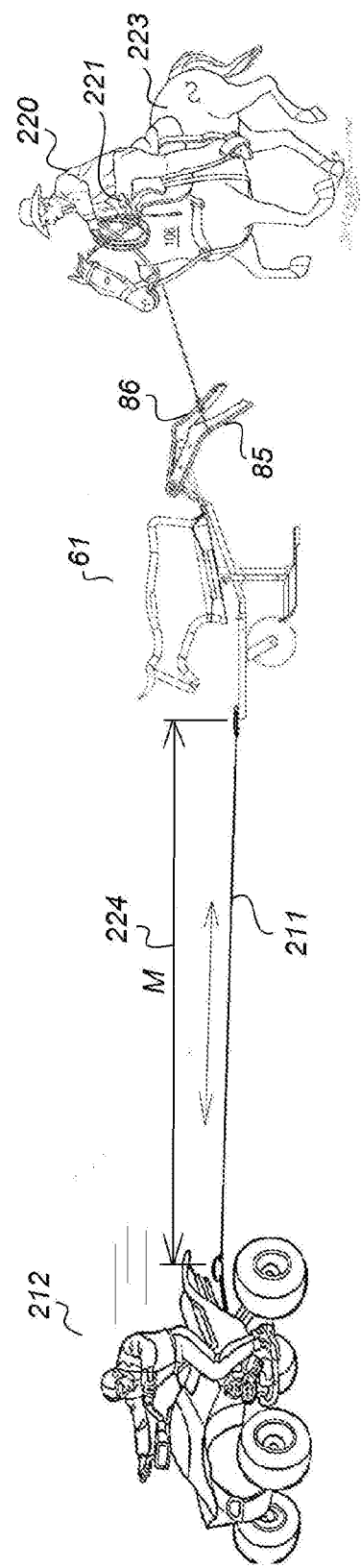

FIG. 22 depicts the bungee tow rope in the stretched position, approximately twelve feet in length, or approximately 70% longer than in the relaxed position, thus providing less of an abrupt impact to the horse and or rider practicing dallying about the saddle horn.

Figure 23:
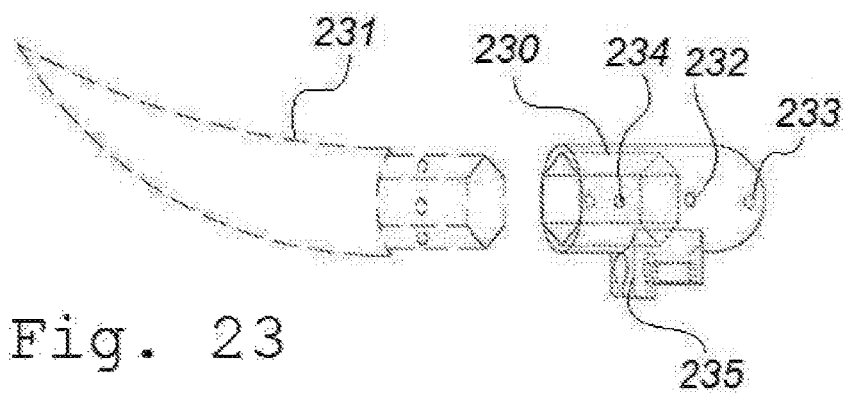

FIG. 23 is a perspective view of a collapsing and overlapping horn socket wherein a horn of any practical length is designed to be inserted and secured, and may be rotated to varying orientations, while still allowing a rope to slip off the horns when pulled taught and collapsed.

Figure 24:
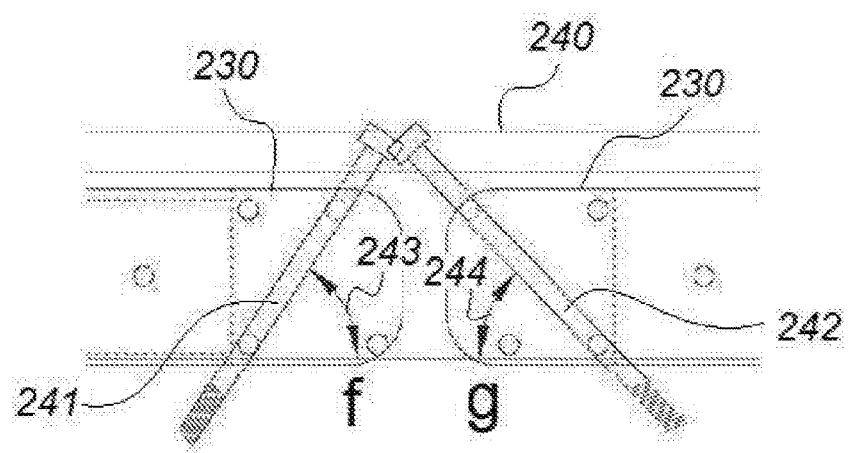

FIG. 24 is a top view of the horn socket illustrating the hubs of the sockets and axles for the hubs attached to the head of a roping dummy, are oriented along different vectors in the horizontal plane, thus allowing the sockets and horns secured therein, to rotate through separate planes, thus allowing the left horn and the right horn to rotate through different planes upon collapse, yet allowing the sockets to be oriented symmetrically about the head of the dummy while in the lowered, stationary position.

Figure 25:
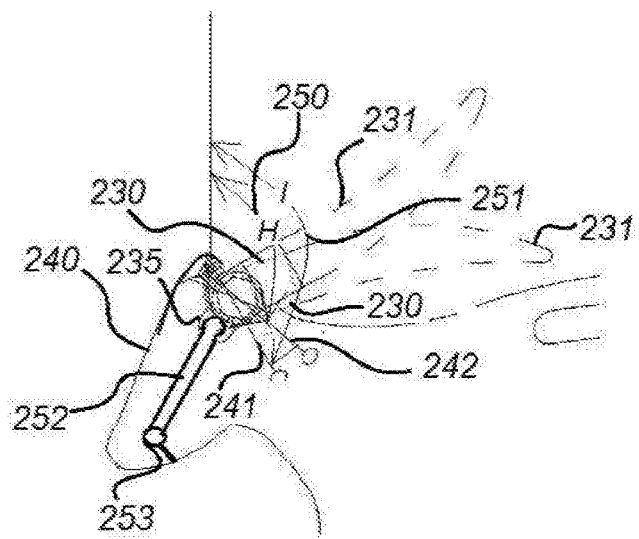

FIG. 25 is a side view of the collapsing horn socket apparatus depicting the left and right horn socket axles attached to a heading dummy and the hubs through the base of the horn sockets oriented along different vectors in the vertical plane.

Figures 26, 27, 28:
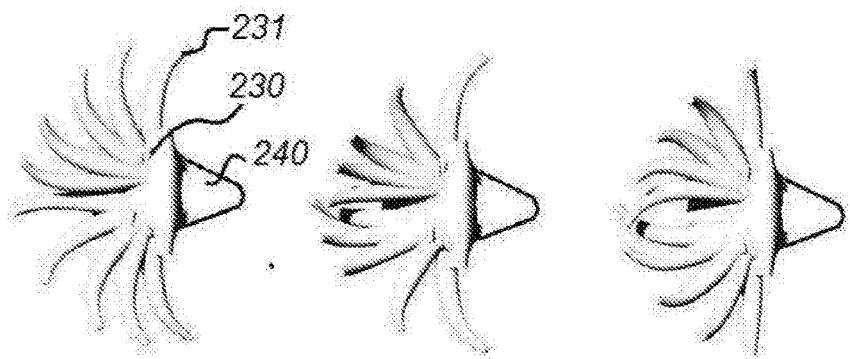

FIGS. 26, 27, and 28 are top views of the illustrating that the collapsible horn socket allows the horns to overlap upon collapse while being oriented in numerous different positions in the stationary or retracted state, including down, forward, and up, or any independent non-symmetrical horn configuration.

DETAILED DESCRIPTION OF THE DRAWINGS

Figure 1:
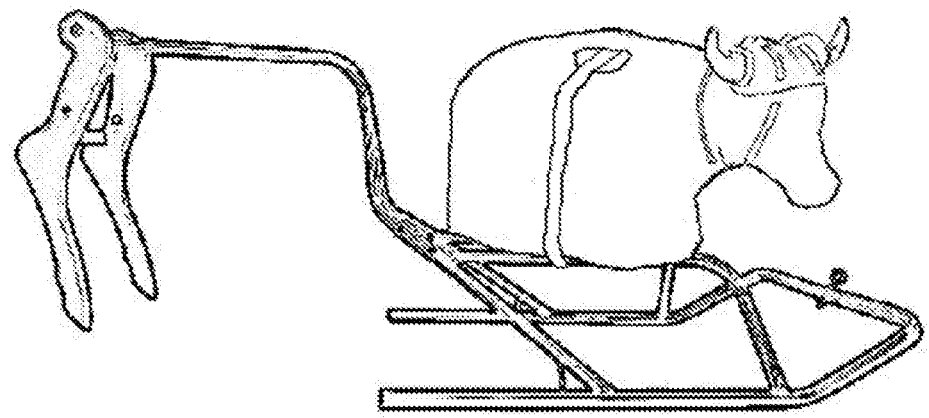
FIG. 1 depicts an embodiment of the prior art whereby the ground heading dummy is either bolted or strapped onto the sled.

Referring now to the drawings, and in particular to FIG. 1, there is shown an embodiment of the prior art consisting of a sled 10 with a ground heading dummy with a solid flat base 11 attached thereto by a tie down strap 12.

Figure 2:
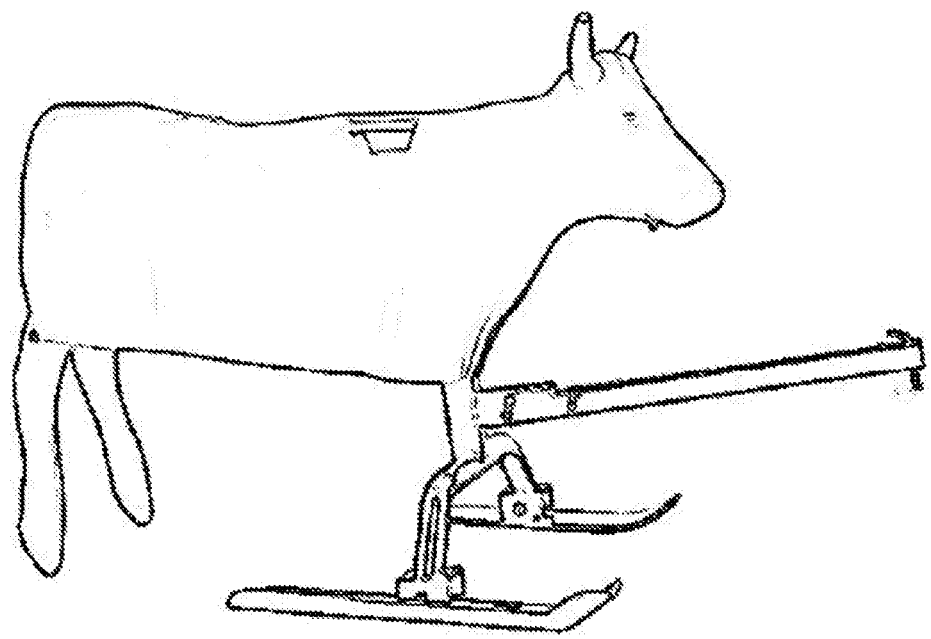
FIG. 2 depicts a second embodiment of the prior art whereby the ground dummy is secured to the sled by being lifted over the body of the sled and positioned on top of the frame, thus requiring the ground dummy to have a hollow base.

Referring now to FIG. 2, there is shown a second embodiment of the prior art consisting of sled 20, a ground heading dummy with a hollow base 21, the dummy 21 being mounted to the sled 20 by being positioned over and lowered onto the sled 20.

Figure 3:
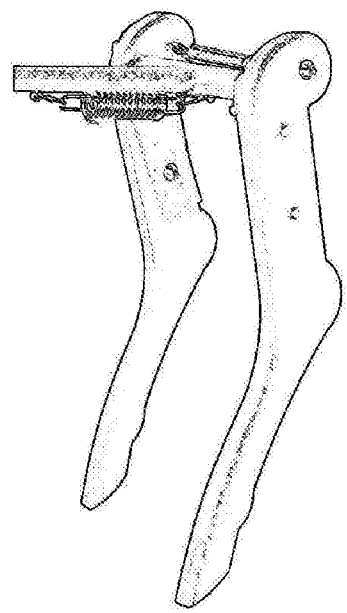
FIG. 3 depicts the sled frame of FIG. 2 over which the heading ground dummy is positioned.

Referring now to FIG. 3, THERE IS SHOWN THE Sled 20 without the dummy 21 illustrating the pins 22 over which the dummy 21 is positioned for securing.

Referring again to FIG. 3, there is also shown the prior art of collapsible legs consisting of a collapsible leg apparatus 30, with a tension spring 31 oriented parallel to the sled 10 in order to retract roping legs 32 forward, and a compression spring 33 positioned at the top of the legs 32 and operating perpendicular to the sled 10.

Figure 4:
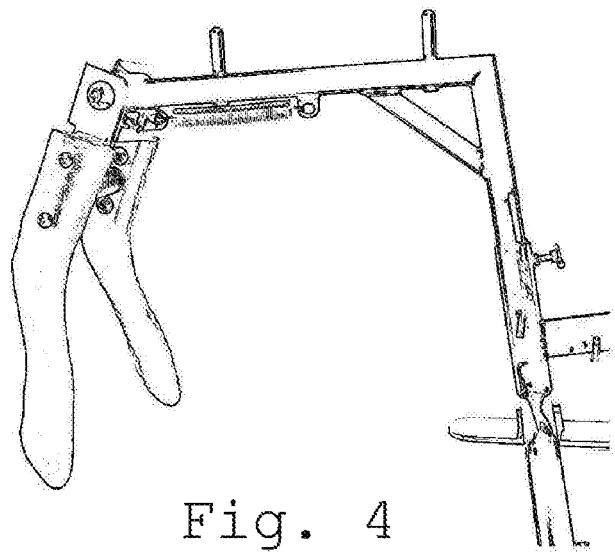

Referring now to FIG. 4, there is shown a second embodiment of a collapsible leg apparatus 40, with a tension spring 41 oriented parallel to the sled 42 in order to retract roping legs 43 forward, and a tension spring 44 mounted between the legs 43 and operating perpendicular to the sled 40.

Figure 5:
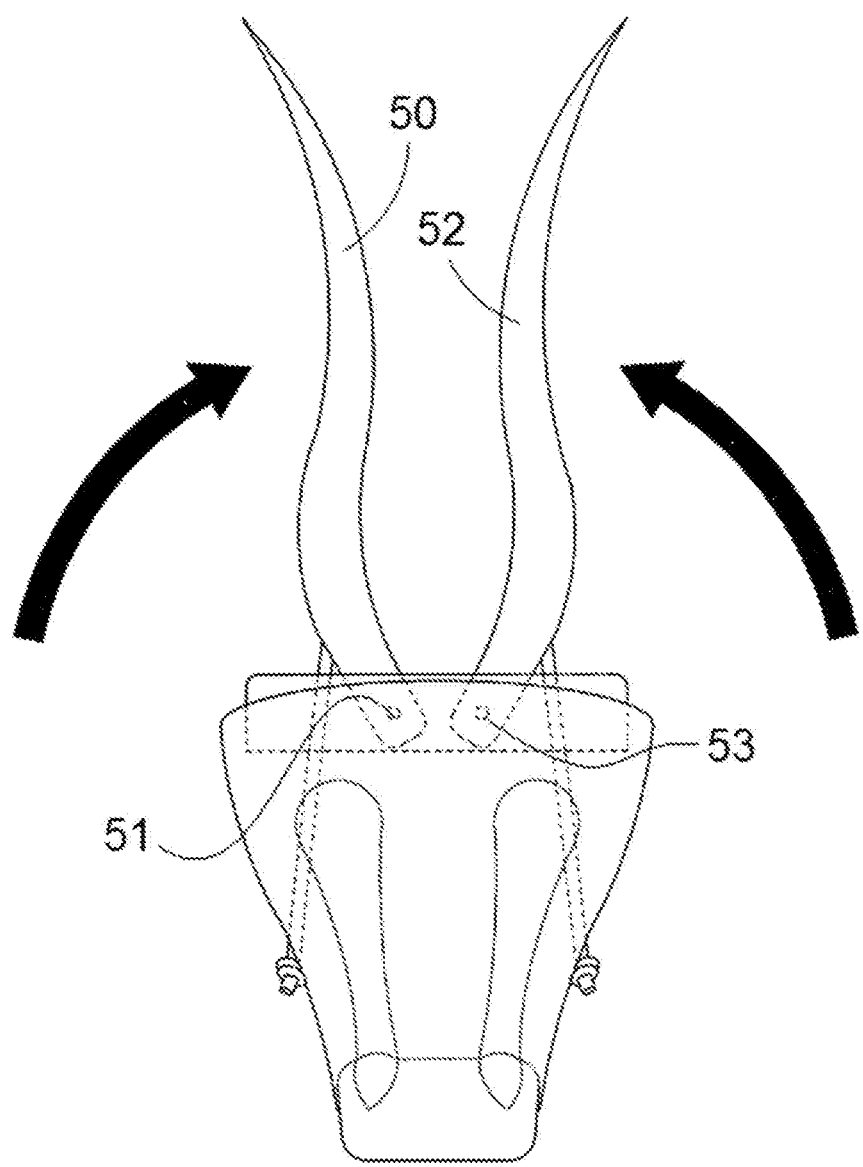
FIG. 5 depicts an embodiment of the prior art of collapsible horns, by Copenhaver, illustrating that the horns rotate about two axes that operate within the same plane and come together at tor near the tips of the horns upon collapse.

Referring now to FIG. 5, there is depicted an embodiment of the prior art of collapsible horns consisting of a left horn 50 positioned about a left horn axle 51 and a right horn 52 positioned about a right horn axle 53, each axle being oriented along parallel vectors, thus rotating within a single plane resulting in the horns 50 and 52 colliding upon collapse.

Referring now to FIG. 6 there is a perspective view of the current invention, a heeling and heading roping practice apparatus 60 comprising a heeling sled apparatus 61 with a ground heading dummy 62 with a flanged base 63 and solid flat bottom 64 secured to the sled 61 via a dummy bracket apparatus 65, and a crossover roping leg apparatus 66 mounted to the rear of the sled 61.

Referring now to FIG. 7, there is a perspective view of a heeling sled apparatus 61 comprising a mainframe 70, a tow arm 71 with an open faced tow hook 72, a closed tow ring 73, a wheel assembly 74, left support leg 75, right support leg 76, left skid 77, right skid 78, a dummy bracket apparatus comprising dummy brackets 79 having an inward angled clasp 80 and being attached to the support legs 75 and 76 with securing devices which in this embodiment are coupler pins 81, dummy securing straps 82 which in this embodiment or steel cables, and a quick release latch 83 which in this embodiment is a j-hook clamp, and dummy securing strap attachment rings 84 which in this embodiment are closeable chain links, a crossover roping leg apparatus 66, a left roping leg 85, a right roping leg 86, a left leg tension device 87, and a right leg tension device 88, said tension devices being rubber bungee straps in this embodiment.

Referring now to FIG. 8, there is shown a roping leg apparatus with independent and overlapping legs 64, with a hub and axle assembly 87, comprising a mounting hub 88, with securing holes 89, a stopper plate 300, non-linear left and right axles 90 and 91, a left leg hinge 92 and right leg hinge 93 (not visible), attached thereto are left and right roping legs 85 and 86, with the middle bent portion of the roping legs being the left and right hocks 94 and 95, and the bottom or distal end of the legs being the left and right toes 96 and 97, and left and right tension devices 87 and 88 which in this embodiment are rubber bungee cords.

Referring now to FIG. 9, there is shown in more detail a perspective view of the hub and axle assembly 87 with a mounting hub 88, non-linear axles 90 and 91, and securing holes 89.

Referring now to FIG. 10, there is a rear view of the hub and axle assembly 90 depicting an angle 100 of "a" degrees from horizontal.

Referring now to FIG. 11, there is a top view of the hub and axle assembly 87 with an angle 110 of "b" degrees aft of the mounting hub 88 positioned on a sled 61 for reference.

Referring now to FIGS. 12, 13, and 14 there are shown front, side and top views of a right leg hinge 93, with a right roping leg 66 attached thereto for reference, comprising a bracket hub 121, bracket arm 122, tension device connector ring 123, bolt holes 124, and stopper bar 125, with vertical angle "c" 126 and horizontal angle "d" 127 relative to the hinge 121 and hub 122. The left leg hinge (not shown) is a mirror opposite of the right leg hinge 93.

Referring now to FIGS. 15 and 16, there are side and rear views of the sled apparatus 61 with the hip and leg apparatus 64 attached thereto, with the left leg 65 and the right leg 66 roped and pulled taught, the hock 90 of the right leg overlapping the hock of the left leg 89. FIGS. 15 and 16 also show the slide stabilizer fin 400.

Referring now to FIG. 17, there is a side view of the sled 61 with roping leg apparatus 64, with only the right leg 86 pulled taught and the left leg 85 remaining in the stationary position, the right bungee cord 88 extended and the left bungee cord 87 stationary.

Referring now to FIG. 18, there is a rear view of the sled 61 with a heading dummy attached thereto and crossover roping leg apparatus 64 rotated about the rear of the mainframe 70 at an angle of "q" 180 and secured by coupler pins 78.

Referring now to FIG. 19, there is an end view of a left dummy bracket 79 with an inward angled clasp 80, being mounted on a sled 61 and securing a heading dummy 64 with a flanged base 63.

Referring back to FIG. 18, there is shown a heading roping dummy 62 with a flanged base 63 secured to a heeling sled 61 by a dummy securing brackets 79 which can be raised or lowered thus resulting in the tilting of the dummy 62 to the left or right in order to change the orientation of the left and right horns 185 and 186.

Referring now to FIG. 20, there is a side view of the sled 61 with heading dummy 62 where the rear securing strap 82 is removed from the securing ring 84, thus releasing the downward tension applied to the rear of the base of the dummy 62 and thus allowing the rear of the dummy 200 to lift up resulting in the lowering of the dummy head 201 by an angle of "e" 202.

Referring now to FIG. 21, there is a bungee tow rope apparatus 210 with an unstretched length of "L" 211 attached to a tow vehicle 212 and a sled 61 in the stationary position.

Referring now to FIG. 22, there is roper 220 having roped the legs 85 and 86 and dallied around the saddle horn 221 and stopping his horse 223 thus impeding the forward momentum of the sled 61, and thus applying tension to the bungee tow rope apparatus 210 resulting in elongation to a length of "m" 224 which is approximately 70% longer than in the relaxed position.

Referring now to FIG. 23, there is perspective view of a crossover collapsible horn socket 230 designed for a horn 231 to be inserted therein, and comprising two asymmetrical hubs 232 and 233 and holes 234 to secure the horn 231 in place, and a tension device mounting arm 235.

Referring now to FIG. 24, there is a top view of two horn sockets 230, secured to a roping dummy head 240 by a left axle 241 and a right axle 242, which in this embodiment are hex bolts secured to the dummy 240, the left and right axles 240 and 241 being oriented at different horizontal angles represented by "f" 243 and "g" 244, thus allowing rotation through separate planes.

Referring now to FIG. 25, there is a cross-sectional side view of two horn sockets 230, secured to a dummy head 240 by a left axle 241 and a right axle 242 being oriented at different vertical angles, "H" 250 and "I" 251", with a tension device 252 secured to the mounting arm 235 and secured to a mounting ring 253 attached to the inside of the dummy 240, to retract the horn sockets 230 and thus the horns 231.

Referring now to FIGS. 26, 27 and 28, there are top views of a dummy head 240 incorporating two crossover collapsible horn sockets 230, with horns 231 positioned down FIG. 27, straight forward FIG. 28, and up FIG. 29 secured therein, and illustrating that when the horns rotate, regardless of the stationary position of each horn, they overlap rather than collide upon collapse.

The invention claimed is:

1. A heeling roping practice sled apparatus comprising:
   a mainframe having a front and a back, the mainframe having a right support leg with a right skid attached thereto and a left support leg with a left skid attached thereto,
   a quick release dummy bracket apparatus attached to the top of the right and left support legs, said quick release dummy bracket apparatus comprising dummy brackets with clasps, securing straps, and a quick release mechanical device,
   a tow bar with a front hook and a front wheel attached to the front of the mainframe, and
   a roping leg apparatus attached to the back of the mainframe, the roping leg apparatus comprising:
      non-linear axles affixed to a mounting hub, coupling, spindle or other mounting element which may be mounted over or secured to a mounting receptor of complimentary configuration,
      left and right leg hinges, each leg hinge comprised of a bracket hub having an axis and a bracket arm affixed to said bracket hub at an angle that is non-perpendicular to the axis of the bracket hub,
      left and right roping legs affixed to said leg hinges, each roping leg having a toe and a hock, an angular configuration of the non-linear axles and the leg hinges being such that when the roping legs are in a stationary position the toes and the hocks are separated from each other, and when apprehended by a rope, the roping legs come together and overlap at the hocks by means of angular rotation about the non-linear axles and the leg hinges upon the rope being pulled taught, and
      whereby each roping leg is retracted to the stationary position by a single tension element operating in a single plane.

2. The invention of claim 1 whereby the bracket hub of the roping leg apparatus is comprised of holes or settings about the bracket hub that allow for rotation, vertical adjustment, and securing of the roping leg apparatus to the mainframe such that the roping legs may be positioned in a skewed, raised, or lowered manner relative to the mainframe of the heeling roping practice sled apparatus.

3. The heeling roping practice sled apparatus of claim 1 and further comprising:
   wherein the non-linear axles are comprised of holes wherein a push pin or other element may be inserted or positioned to serve as a stopper for the leg hinges to allow for various settings for which the stationary position of each roping leg may be adjusted such that a distance between the toes may be varied and such that the roping legs may be positioned asymmetrically relative to the mainframe.

4. The invention of claim 1 where the right support leg is longer than the left support leg.

5. The invention of claim 1 where the right skid or left skid or both skids are comprised of a stabilizing fin affixed to a bottom rear of the skid.

* * * * *